(12) United States Patent
Maag et al.

(10) Patent No.: US 6,333,077 B1
(45) Date of Patent: Dec. 25, 2001

(54) METHOD FOR MULTI LAYER ENAMELING AND COATING COMPOUNDS FOR SAID METHOD

(75) Inventors: Karin Maag, Haltorn; Karl-Friedrich Dössel, Wuppertal, both of (DE)

(73) Assignee: Herberts GmbH & Co. KG, Wuppertal (DE)

( * ) Notice: Subject to any disclaimer, the term of this patent is extended or adjusted under 35 U.S.C. 154(b) by 0 days.

(21) Appl. No.: 09/380,084

(22) PCT Filed: Mar. 6, 1998

(86) PCT No.: PCT/EP98/01334

§ 371 Date: Nov. 22, 1999

§ 102(e) Date: Nov. 22, 1999

(87) PCT Pub. No.: WO98/40170

PCT Pub. Date: Sep. 17, 1998

(30) Foreign Application Priority Data

Mar. 7, 1997 (DE) .............................................. 197 09 560

(51) Int. Cl.[7] ....................................................... C08F 2/46
(52) U.S. Cl. .................... 427/496; 106/285; 252/600; 427/385.5; 427/407.1; 427/508; 427/514; 427/551; 427/558; 427/559
(58) Field of Search .................................... 427/496, 508, 427/514, 551, 558, 559, 385.5, 407.1; 252/600; 106/285

(56) References Cited

U.S. PATENT DOCUMENTS

| | | |
|---|---|---|
| 4,675,234 | 6/1987 | Sachs . |
| 5,486,384 | 1/1996 | Bastian . |

FOREIGN PATENT DOCUMENTS

| | | |
|---|---|---|
| Nr. 356 781 | 5/1980 | (AT) . |
| 0 000 407 B1 | 1/1979 | (EP) . |
| 0 247 563 A2 | 12/1987 | (EP) . |
| 0 540 884 A1 | 5/1993 | (EP) . |

OTHER PUBLICATIONS

Patent Abstracts of Japan, vol. 11, No. 326 (C–454), Oct. 23, 1987; & JP, A, 62–110779 (Yoshinori Tsuchiya), May 21, 1987.

*Primary Examiner*—Bernard Pianalto
(74) *Attorney, Agent, or Firm*—Pillsbury Winthrop LLP

(57) ABSTRACT

A process for lacquer coating substrates with a colored and/or effect base lacquer and a clear lacquer topcoat, in which a colored and/or effect base lacquer layer of a base lacquer coating composition is applied onto a substrate and is provided in a wet-on-wet process with a clear lacquer coating. Before being jointly stoved or jointly cured with the base lacquer layer, the uncured clear lacquer layer is exposed to high-energy radiation. In the clear lacquer coating composition, the resin solids content contains 50 to 98 wt. % of a system A) thermally curable by addition and/or condensation reactions, which system contains substantially no free-radically polymerisable double bonds and substantially no groups capable of reacting in another way with free-radically polymerisable double bonds of a system B). The resin solids content further contains 2 to 50 wt. % of a system B) which is curable under the action of high-energy radiation by free-radical polymerisation of olefinic double bonds, wherein the weight percentages adds up to 100 wt. % and the C=C equivalent weight of the total resin solids content of A) and B) is between 300 and 10000. Clear lacquer coating compositions made by the process are also described.

8 Claims, No Drawings

METHOD FOR MULTI LAYER ENAMELING AND COATING COMPOUNDS FOR SAID METHOD

FIELD OF THE INVENTION

This invention relates to a process for lacquer coating substrates with a coloured and/or effect base lacquer and a clear lacquer topcoat and to clear lacquer coating compositions usable in this process.

BACKGROUND OF THE INVENTION

Modern automotive original lacquer coatings generally consist of a base lacquer/clear lacquer topcoat, which is applied onto a body which has been electrophoretically primed and coated with surfacer. In such coating processes, the coloured and/or effect base lacquer and the clear lacquer are preferably applied wet-on-wet, i.e. the base lacquer and subsequently applied clear lacquer are jointly stoved.

The optical/aesthetic qualities of such base lacquer/clear lacquer two layer lacquer coatings are substantially influenced by the quality of the clear lacquer layer. ideally, the texture of the clear lacquer layer is identical on the horizontal and vertical surfaces of a three-dimensional substrate, for example an automotive body, which may be ascertained, for example, by determining the long- and short-wave components of the surface texture of the clear lacquer surface. This ideal situation is, however, not straightforward to achieve in practice. For example, differences in surface texture or leveling of the outer clear lacquer layer may occur as, once applied and in particular during the heating phase of the stoving process, the clear lacquers have a tendency to run or sag on non-horizontal surfaces due to a temperature-determined reduction in viscosity. There are various ways of counteracting unwanted running phenomena in clear lacquers. For example, additives having a favourable effect on running behaviour are added to the stoving clear lacquers.

However, this frequently results in reduced gloss of the clear lacquer layer, if the clear lacquer layer is compared with a clear lacquer layer produced from a corresponding, additive-free stoving clear lacquer. Another possibility for counteracting unwanted running phenomena in clear lacquers involves rotating the substrate around an axis after application of the stoving lacquer during the flashing-off and/or stoving operations, an approach which is disclosed, for example, in EP-B-0 261 644.

Longer term retention of the optical/aesthetic qualities of base lacquer/clear lacquer two coat lacquer coatings, in particular in automotive applications, is substantially determined by the clear lacquer layer's resistance to chemicals and scratching, which is in particular manifested over a relatively long period of service by a greater or lesser resistance to acid rain and washing scratches.

EP-A-0 000 407 describes a radiation-curing coating composition based on a hydroxy-functional polyester resin esterified with acrylic acid, a vinyl compound, a photoinitiator and a polyisocyanate. In a first curing stage, the coating is radiation-cured by UV light and in a second curing stage hydroxyl/isocyanate crosslinking imparts the final hardness to the coating composition. The second curing stage may proceed at elevated temperature.

EP-A-0 247 563 describes a radiation-curable coating composition based on a poly(meth)acryloyl-functional compound, a polyol mono(meth)acrylate, a polyisocyanate, a light stabiliser and a photoinitiator. Radiation curing proceeds by UV light. The hydroxyl functions in one part of the radiation-curing binder provide an additional possibility for curing the polyisocyanate, for example in shaded areas.

EP-A-0 540 884 describes a process for the production of a multilayer lacquer coating by applying a clear lacquer coating onto a dried or crosslinked coloured and/or effect base lacquer layer, wherein the clear lacquer coating is applied from a coating composition which is curable solely by free-radical and/or cationic polymerisation and curing is initiated and/or performed by high-energy radiation.

SUMMARY OF THE INVENTION

The object of the invention is to provide a process which may be performed wet-on-wet for lacquer coating substrates with a coloured and/or effect base lacquer and a clear lacquer topcoat with outstanding optical/aesthetic qualities. The process to be provided should prevent running of the clear lacquer on vertical surfaces and clear lacquer layers should be formed which have reduced susceptibility to chemicals and scratching, in particular to acid and washing scratches. In particular, it should be possible to perform the process using clear lacquer coating compositions of a simple composition, preferably such compositions which may be formulated from conventional, for example commercially available components, i.e. any constituents of the clear lacquer coating composition which are not commercially available should be simple to synthesis.

It has been found that this object may surprisingly be achieved by a process for the production of a multilayer lacquer coating, in which a coloured and/or effect base lacquer layer of a base lacquer coating composition is applied onto a substrate and is provided in a wet-on-wet process with the clear lacquer coating, wherein, before being jointly stoved or jointly cured with the base lacquer layer, the uncured clear lacquer layer is exposed to high-energy radiation, characterised in that the clear lacquer coating composition used is one, the resin solids content of which consists of 50 to 98 wt. % of a system A) thermally curable by addition and/or condensation reactions, which system contains substantially no free-radically polymerisable double bonds and substantially no groups capable of reacting in another way with free-radically polymerisable double bonds of system B), and of 2 to 50 wt. % of a system B) which is curable under the action of high-energy radiation by free-radical polymerisation of olefinic double bonds, wherein the weight percentages add up to 100 wt. % and wherein the C=C equivalent weight of the total resin solids content from A) and B) is between 300 and 10000.

The weight percentages here and below relate in each case to the composition of the resin solids content (=total of all film-forming constituents of the clear lacquer coating composition=sum of all constituents of systems A) and B)). Resin solids content here and below means the theoretical resin solids content, which takes account neither of any evaporative losses nor of stoving losses during application and curing of the clear lacquer coating composition. This resin solids content, together with any further non-volatile constituents optionally present in the clear lacquer coating composition, constitutes the solids content thereof.

The phrase "contains substantially no free-radically polymerisable double bonds and substantially no groups capable of reacting with free-radically polymerisable double bonds of system B)" means here and below that, apart from a possible content arising from industrial contamination, system A) contains no free-radically polymerisable double bonds nor any groups capable of reacting in another way with free-radically polymerisable double bonds of system B).

This invention furthermore relates to the clear lacquer coating compositions usable in the process according to the invention, which are characterised in that the resin solids content thereof consists of 50 to 98 wt. % of a system A) thermally curable by addition and/or condensation reactions, which system contains substantially no free radically polymerisable double bonds and substantially no groups capable of reacting in another way with free radically polymerisable double bonds of system B), and of 2 to 50 wt. % of a system B) which is curable under the action of high-energy radiation by free-radical polymerisation of olefinic double bonds, wherein the weight percentages add up to 100 wt. % and wherein the C═C equivalent weight of the total resin solids content from A) and B) is between 300 and 10000.

The coloured and/or effect base lacquer coating layer may be produced in the process according to the invention using per se known coloured and/or effect base lacquer coating compositions applicable by spraying, as are used for the production of base lacquer/clear lacquer two layer lacquer coatings and large numbers of which are known, for example, from the patent literature.

Base lacquers usable for the production of the coloured and/or effect base lacquer layer in the process according to the invention may be physically drying or crosslinkable with the formation of covalent bonds. Base lacquers which crosslink with the formation of covalent bonds may be intrinsically or extrinsically crosslinking systems.

The coloured and/or effect base lacquers usable in the process according to the invention are liquid coating compositions. They may comprise single or multi-component coating compositions, with single component compositions being preferred. They may comprise systems based on organic solvents or they preferably comprise aqueous base lacquers, the binder systems of which are suitably, for example anionically, cationically or nonionically, stabilised.

The base lacquer coating compositions usable in the process according to the invention are conventional lacquer systems which contain one or more conventional film-forming binders. In the event that the binders are not intrinsically crosslinking or self-drying, they may optionally also contain crosslinking agents. No restrictions apply to either the binders or crosslinking agents. Examples of usable film-forming binders are polyester, polyurethane and/or (meth)acrylic copolymer resins. (Meth)acrylic here and below means acrylic and/or methacrylic. The preferred aqueous base lacquers preferably contain polyurethane resins, particularly preferably in a minimum proportion of 15 wt. %, relative to the solid resin content of the aqueous base lacquer. Selection of the is optionally present crosslinking agents is non-critical and is determined in accordance with the functionality of the binders, i.e. the crosslinking agents are selected such that they have a reactive functionality complementary to the functionality of the binders. Examples of such complementary functionalities between binder and crosslinking agent are: hydroxyl/methylol ether, hydroxyl/free isocyanate, hydroxyl/blocked isocyanate, carboxyl/epoxide. Provided that they are mutually compatible, two or more such complementary functionalities may simultaneously be present in a base lacquer. The crosslinking agents optionally used in the base lacquers may be present individually or as a mixture.

Apart from the conventional physically drying and/or chemically crosslinking binders, the base lacquers used in the process according to the invention also contain inorganic and/or organic colouring pigments and/or effect pigments, such as for example titanium dioxide, iron oxide pigments, carbon black, azo pigments, phthalocyanine pigments, quinacridone pigments, metal pigments, for example made from titanium, aluminium or copper, interference pigments, such as for example aluminium coated with titanium dioxide, coated mica, graphite effect pigments, lamellar iron oxide, lamellar copper phthalocyanine pigments.

The base lacquers may furthermore contain conventional lacquer additives, such as for example extenders, catalysts, leveling agents, anticratering agents or in particular light stabilisers, optionally combined with antioxidants.

The coloured and/or effect base lacquer layer applied by spraying may be applied as a two layer base lacquer system consisting of a first, modified base lacquer layer and a second base lacquer layer which determines the actual colour tone of the multilayer lacquer coating. In this case, the first base lacquer is modified, for example by containing additional modifying binder and/or extender components. It may, for example, be produced from the subsequently applied base lacquer which determines the actual colour tone by mixing with the additional components.

The clear lacquer coating compositions usable in the process according to the invention are liquid clear lacquers. They may comprise single and/or multicomponent clear lacquer coating compositions, with single component, storage-stable clear lacquer coating compositions being preferred. They may be solvent-free or water-borne, preferably aqueous emulsions, or they preferably comprise solvent-based systems. It is essential to the invention that the clear lacquer coating compositions have a resin solids content which consists of 50 to 98 wt. %, preferably of 70 to 95 wt. %, of a system A) thermally curable by addition and/or condensation reactions, which system contains substantially no free-radically polymerisable double bonds and substantially no groups capable of reacting in another way with free-radically polymerisable double bonds of system B), and of 2 to 50 wt. %, preferably of 5 to 30 wt. %, of a system B) which is curable under the action of high-energy radiation by free-radical polymerisation of olefinic double bonds, wherein the weight percentages add up to 100 wt. % and wherein the C═C equivalent weight of the entire resin solids content formed from the total of A) and B) is between 300 and 10000, preferably between 350 and 3000, in particular between 400 and 1500.

The systems A) thermally curable by addition and/or condensation reactions, which systems contain substantially no free-radically polymerisable double bonds and substantially no groups capable of reacting in another way with free-radically polymerisable double bonds of system B), comprise binders into which optionally reactive diluents (compounds which are chemically incorporated into lacquer film during stoving) and optionally crosslinking systems for clear lacquer coating compositions are incorporated, preferably for such clear lacquer coating compositions as may be used in the production of base lacquer/clear lacquer two layer lacquer coatings. The binders particularly preferably comprise conventional binders known to the person skilled in the art, into which optionally reactive diluents and optionally crosslinking systems for clear lacquer coating compositions are incorporated, as are prior art in the production of base lacquer/clear lacquer two layer coatings and are known, for example, from numerous patent documents.

The systems A) thermally curable by addition and/or condensation reactions consist of one or more film-forming binder, optionally of one or more reactive diluents, and, if the binders are not intrinsically crosslinking, of one or more crosslinking agents for the binders and optionally present reactive diluents. Preferred extrinsically crosslinking systems A) are those in which binders, optionally present reactive diluents and crosslinking agents are present in a stoichiometric ratio adapted to the desired degree of crosslinking of generally 60 to 90 parts of binder and optionally reactive diluents to 40 to 10 parts of crosslinking agent, wherein the total amounts to 100 parts. No restrictions in principle apply to the binder, the reactive diluents and the crosslinking agents, except that they contain substantially no free-radically polymerisable double bonds and substantially no groups capable of reacting in another way with free-radically polymerisable double bonds of system B) and may be thermally inducibly cured by addition and/or condensation reactions. Film-forming binders which may be used are, for example, polyester, polyurethane, (meth)acrylic copolymer and/or triazine-derived resins. The binders preferably contain substantially no aromatic structural units and are based on aliphatic and/or cycloaliphatic units. The (meth) acrylic copolymer resins may contain aromatic structural units, for example in the form of copolymerised styrene. In the case of intrinsically crosslinking binders, these contain mutually complementary reactive groups as the basis for covalent crosslinking. In the case of the preferred extrinsically crosslinking binders, the per se non-critical selection of the crosslinking agents present in this case is determined by the functionality of the binders, i.e. the crosslinking agents are selected such that they have a reactive functionality complementary to the functionality of the binders, wherein the functional groups may react together thermally by addition and/or condensation. Examples of addition reactions suitable for crosslinking systems A) are ring-opening addition of an epoxide group onto a carboxyl group forming an ester and a hydroxyl group, the addition of a hydroxyl group onto an isocyanate group forming a urethane group, while examples of condensation reactions suitable for crosslinking systems A) are the reaction of a hydroxyl group with a blocked isocyanate group forming a urethane group and eliminating the blocking agent, the reaction of a hydroxyl group with an N-methylol group eliminating water, the reaction of a hydroxyl group with an N-methylol ether group eliminating the etherification alcohol, the transesterification reaction of a hydroxyl group with an ester group eliminating the esterification alcohol, the transurethanisation reaction of a hydroxyl group with a carbamate group eliminating alcohol, the reaction of a carbamate group with an N-methylol ether group eliminating the etherification alcohol. Providing that they are mutually compatible, two or more complementary functionalities may simultaneously be present in a system A) thermally curable by addition and/or condensation reaction, such that two or more of the various types of reaction stated above by way of example may occur during stoving. The crosslinking agents optionally used in the systems A) may be present individually or as a mixture.

Preferred single-component systems A) are those which have hydroxy-functional (meth)acrylic copolymers, polyester resins and/or polyurethane resins individually or as a mixture as the binder and optionally additionally contain hydroxy-functional reactive diluents, while the crosslinking agents for the hydroxy-functional binders and optionally present hydroxy-functional reactive diluents comprise, for example, triazine-based components, for example amino resins, in particular melamine resins, which crosslink with the hydroxyl groups thereof forming ether and/or ester groups and/or transesterification crosslinking agents and/or blocked polyisocyanates.

Preferred two-component systems A) are those which have hydroxy-functional (meth)acrylic copolymers, polyester resins and/or polyurethane resins individually or as a mixture as the binder and optionally additionally contain hydroxy-functional reactive diluents, while the crosslinking agents for the hydroxy-functional hinders and optionally present hydroxy-functional reactive diluents comprise free polyisocyanates.

Examples of hydroxy-functional polyester resins usable as the binder in the systems A) are conventional, for example those having a number average molecular weight (Mn) of 500 to 5000, preferably of 1000 to 3000 and hydroxyl values of 30 to 450, preferably of 50 to 280 mg of KOH/g.

Examples of hydroxy-functional polyurethane resins usable as the binder in the systems A) are conventional, for example those having a number average molecular weight (Mn) of 500 to 5000, preferably of 1000 to 3000 and hydroxyl values of 30 to 450, preferably of 50 to 280 mg of KOH/g.

Examples of hydroxy-functional (meth)acrylic copolymers usable as the binder in the systems A) are conventional, for example those having a number average molecular weight (Mn) of between 1000 and 10000 and hydroxyl values of 30 to 300, preferably of 50 to 250 mg of KOH/g. The (meth)acrylic copolymers may have been produced in the presence of oligomeric or polymeric polyester and/or polyurethane resins.

Examples of hydroxy-functional reactive diluents usable in the systems A) are low molecular weight compounds having at least two hydroxyl groups per molecule and hydroxyl values in the range from 250 to 700 mg of KOH/g. Oligomeric or polymeric polyols, such as polyether polyols, oligoester polyols, polycarbonate polyols and oligourethane polyols are suitable. Commercial products are, for example, suitable, such as polycaprolactone polyols obtainable by reacting polyols with caprolactone, polyether polyols, such as for example triethylene glycol, obtainable by reacting oxirane compounds with polyols and/or water, or oligourethane polyols obtainable by reacting polyamines with cyclic carbonates.

Examples of polyisocyanates usable in free or blocked form in the systems A) as crosslinking agents for the hydroxy-functional binders and optional reactive diluents are cycloaliphatic or aliphatic diisocyanates such as tetramethylene diisocyanate, 1,6-hexamethylene diisocyanate, 1,12-dodecane diisocyanate, 1,3- and 1,4-cyclohexane diisocyanate, isophorone diisocyanate, biscyclohexylmethane diisocyanate or mixtures thereof.

Other suitable isocyanates apart from these simple isocyanates are those which contain heteroatoms in the residue linking the isocyanate groups. Examples of these are polyisocyanates having carbodiimide groups, allophanate groups, isocyanurate groups, uretidione groups, urethane groups, acylated urea groups and biuret groups.

Known polyisocyanates which are primarily used in the production of lacquers are particularly suitable, for example modification products of the above-stated simple polyisocyanates containing biuret, isocyanurate or urethane groups, in particular tris-(6-isocyanatohexyl)biuret, the isocyanurate derived from isophorone diisocyanate or hexane diisocyanate or polyisocyanates having low molecular weight urethane groups, as may be obtained by reacting excess isophorone diisocyanates with simple polyhydric alcohols of the molecular weight range from 62 to 300, in particular with trimethylolpropane. Any desired mixtures of the stated polyisocyanates may, of course, also be used.

Suitable polyisocyanates furthermore include known prepolymers having terminal isocyanate groups, as are in particular obtainable by reacting the above-stated simple polyisocyanates, especially diisocyanates, with substoichiometric quantities of organic compounds having at least two groups capable of reacting with isocyanate groups. Suitable blocking agents for the polyisocyanate crosslinking agents described above are the conventional compounds, such as conventional CH-acidic, NH—, SH— or OH— functional compounds. These may be used for blocking individually or as a mixture. Examples are CH-acidic compounds such as acetylacetone or CH-acidic esters, such as for example acetoacetic acid alkyl esters, malonic acid dialkyl esters, aliphatic or cycloaliphatic alcohols, such as n-butanol, isopropanol, tert.-butanol, furfurol, 2-ethylhexanol, cyclohexanol; oximes such as methyl ethyl ketoxime, acetone oxime, cyclohexanone oxime, acetophenone oxime, lactams such as ε-caprolactam or 2-pyrrolidone, imidazoles such as 2-methylimidazole, pyrazoles such as 2,3-dimethylpyrazole. CH-acidic esters and/or oximes are preferred blocking agents.

Examples of triazine-based components which crosslink with the hydroxy-functional binders and optionally additionally present reactive diluents forming ether groups are, for example, amino resins conventional as crosslinking agents, preferably melamine resins, such as for example methanol-etherified melamine resins, such as the commercial products Cymel 325, Cymel 327, Cymel 350 and Cymel 370, Maprenal MF 927. Further examples of usable melamine resins are butanol- or isobutanol-etherified melamine resins such as for example the commercial products Setamin US 138 or Maprenal MF 610; co-etherified melamine resins which are both butanol- and methanol-etherified, such as for example Cymel 254, as well as hexamethoxymethylmelamine (HMMM), such as for example Cymel 301 or Cymel 303, wherein the latter may require an external acid catalyst, such as for example p-toluenesulfonic acid for crosslinking. Such acid catalysts may optionally be ionically or nonionically blocked with amines or polyepoxides.

Transesterification crosslinking agents, such as for example preferably tris(alkoxycarbonylamino)triazine, are examples of triazine-based components in the systems A) which crosslink with the hydroxy-functional binders and optionally additionally present reactive diluents to form ester groups, in particular to form urethane groups (carbamic acid ester groups).

It is particularly preferred in the process according to the invention to use clear lacquer coating compositions, the resin solids content of which as system A) contains an extrinsically crosslinking system comprising a hydroxy-functional binder, in particular based on (meth)acrylic copolymer, and one or more amino resins as the crosslinking agent.

The systems B) comprise free-radically curing systems, i.e. free-radicals are formed by the action of high-energy radiation on the system B), which free radicals initiate crosslinking of the system B) by free-radical polymerisation of the olefinic double bonds thereof. The systems B) are of a composition such that, under the application and curing conditions of the clear lacquer coating composition containing them, they do not react or do not react to an appreciable extent with the particular system A) present in said clear lacquer coating composition.

The free-radically curing systems comprise prepolymers, such as polymers or oligomers, which have free-radically polymerisable, olefinic double bonds, in particular (meth) acryloyl groups, in the molecule. Apart from the free-radically polymerisable double bonds, the prepolymers preferably contain no functional groups which can bring about crosslinking with constituents of system A). The prepolymers may be present in combination with reactive diluents, i.e. reactive liquid monomers. The free-radically curing systems preferably also contain photoinitiators.

Examples of prepolymers or oligomers are (meth)acrylic-functional (meth)acrylic copolymers, which may contain aromatic structural units, for example in the form of copolymerised styrene, as well as epoxy resin (meth)acrylates, polyester (meth)acrylates, polyether (meth)acrylates, polyurethane (meth)acrylates, unsaturated polyesters, unsaturated polyurethanes or silicone (meth)acrylates preferably containing no aromatic structural units, based on aliphatic and/or cycloaliphatic units and having number average molecular weights (Mn) preferably in the range from 200 to 10000, particularly preferably from 500 to 3000 and having on average 2 to 20, preferably 3 to 10 free-radically polymerisable, olefinic double bonds per molecule.

If reactive diluents are used, they are preferably used in quantities of 1 to 50 wt. %, preferably of 5 to 30 wt. %, relative to the total weight of prepolymers and reactive diluents. These comprise defined low molecular weight compounds, which may be mono-, di- or polyunsaturated. Examples of such reactive diluents are: (meth)acrylic acid and the esters thereof, maleic acid and the semi-esters thereof, vinyl acetate, vinyl ethers, substituted vinyl-ureas, ethylene and propylene glycol di(meth)acrylate, 1,3- and 1,4-butanediol di(meth)acrylate, vinyl (meth)acrylate, allyl (meth)acrylate, glycerol tri-, di- and mono(meth)-acrylate, trimethylolpropane tri-, di- and mono(meth)-acrylate, styrene, vinyltoluene, divinylbenzene, pentaerythritol tri- and tetra(meth)acrylate, di- and tripropylene glycol di(meth) acrylate, hexanediol di(meth)acrylate, as well as mixtures thereof.

The photoinitiators preferably present in the free-radically curing system B) are used, for example, in quantities of 0.1 to 5 wt. %, preferably of 0.5 to 3 wt. %, relative to the total of free-radically polymerisable prepolymers, reactive diluents and photoinitiators. It is favourable if the absorption thereof is within the range of wavelengths from 260 to 450 nm. Examples of photoinitiators are benzoin and derivatives, acetophenone and derivatives, for example 2,2-diacetoxyacetophenone, benzophenone and derivatives, thioxanthone and derivatives, anthraquinone, 1-benzoylcyclohexanol, organophosphorus compounds, such as for example acyl phosphine oxides. The photoinitiators may be used individually or in combination. Further synergistic components, for example tertiary amines, may moreover also be used.

Apart from the above-stated constituents of the systems B), these may additionally contain thermally activatable free-radical initiators. From temperatures of 80 to 120° C., these form free radicals. Examples of thermolabile free-radical initiators are: organic peroxides, organic azo compounds or C—C cleaving initiators, such as dialkyl peroxides, peroxycarboxylic acids, peroxydicarbonates, peroxide esters, hydroperoxides, ketone peroxides, azodinitriles or benzopinacole silyl ethers. Preferably used quantities are between 0.1 and 5 wt. %, relative to the total of free-radically polymerisable prepolymers, reactive diluents and free-radical initiators. The free-radical initiators may also be used as a mixture.

Apart from the systems A) and B), the clear lacquers usable in the process according to the invention may contain transparent pigments or extenders, as well as conventional lacquer additives, such as for example antioxidants, sensitisers, catalysts, leveling agents, dyes, rheological additives as well as light stabilisers in quantities conventional in lacquers.

The clear lacquer coating compositions usable in the process according to the invention may be formulated without solvents, in which case the solids content thereof is 100 wt. % and is composed of the resin solids content formed by the systems A) plus B) as well as further non-volatile constituents. The clear lacquer coating compositions usable in the process according to the invention preferably have a solids content of 40 to 80 wt. %. In this case, they contain volatile organic solvents, such as for example glycol ethers, such as ethylene glycol monobutyl ether, diethylene glycol monobutyl ether, dipropylene glycol dimethyl ether, dipropylene glycol monomethyl ether, ethylene glycol dimethyl ether; glycol ether esters, such as ethylene glycol monoethyl ether acetate, ethylene glycol monobutyl ether acetate, 3-methoxy-n-butyl acetate, diethylene glycol monobutyl ether acetate, methoxypropyl acetate; esters such as butyl acetate, isobutyl acetate, amyl acetate; ketones, such as methyl ethyl ketone, methyl isobutyl ketone, diisobutyl ketone, cyclohexanone, isophorone; alcohols such as methanol, ethanol, propanol, butanol, aromatic hydrocarbons, such as xylene, Solves so 100 (registered trademark for a mixture of aromatic hydrocarbons having a boiling range from 155 to 185° C.) and aliphatic hydrocarbons, or they comprise aqueous coating compositions in emulsion form. The emulsified state may here be achieved by addition of external emulsifiers or systems A) and/or B) comprise systems which contain groups having a self-emulsifying action in water, for example ionic groups. The emulsion systems may also contain organic solvents, in particular water-miscible solvents.

Surprisingly, the clear lacquer coating compositions usable in the process according to the invention may be produced in a simple manner by mixing the systems A) and B) constituting the resin solids content or by mixing the constituents thereof in a solids weight ratio of 50 to 98 parts of A) to 50 to 2 parts of B), preferably of 70 to 95 parts of A) to 30 to 5 parts of B) (while complying with the above-stated requirements regarding the C=C equivalent weight of the resin solids) with the above-stated constituents which do not contribute to the resin solids content. Mixing preferably proceeds by using commercially available and/or simply synthesised constituents, as are explained above. The order in which the individual constituents are added during mixing is in principle freely selectable and is determined in accordance with practical requirements and is only subject to the restrictions determined by multicomponent systems in the case of the less preferred multicomponent clear lacquer coating compositions. The clear lacquer coating compositions used in the process according to the invention are particularly preferably produced by mixing a system B) and, if desired, organic solvent, into a per se complete single-component stoving clear lacquer, the resin solids content of which consists of a system A) thermally curable by addition and/or condensation reactions, which system A) contains substantially no free-radically polymerisable double bonds and substantially no groups capable of reacting in another way with free-radically polymerisable double bonds of system B), while complying with the above requirements, stated to be essential to the invention, with regard to the composition of the resin solids content and C=C equivalent weight of the resin solids.

In the process according to the invention, the coloured and/or effect base lacquer layer is applied onto an optionally precoated substrate, in particular onto precoated automotive bodies or components thereof. Examples of precoats on automotive bodies or components thereof are an electrocoated primer layer and a sprayed surfacer layer or a two-layer precoat consisting of an electrocoated primer layer and a second electrophoretically applied coating layer.

The coloured and/or effect base lacquer layer is applied by spraying a coloured and/or effect base lacquer to a dry film thickness, dependent upon the colour tone, of generally between 10 and 25 $\mu$m.

Once the coloured and/or effect base lacquer coating layer has been applied, there is a brief flashing-off phase, for example at 20 to 80° C., followed by application of the clear lacquer layer of the clear lacquer coating composition according to the invention to a dry film thickness of generally between 25 and 50 $\mu$m using the wet-on-wet method. Especially when clear lacquer coating compositions containing organic solvents and/or water are used, the coating may optionally be briefly flashed off. It is often convenient and preferred to promote flashing-off by heating, for example preferably with the assistance of infrared radiation. Application and flashing-off are preferably performed in such a manner that exposure to light of a wavelength of less than 380 nm is very largely prevented.

The clear lacquer coating may, but need not necessarily, extend over the entire surface of the, for example, three dimensional substrate. It is accordingly possible in the process according to the invention, for example, preferably to perform coating with the clear lacquer coating composition substantially only on external areas, in particular on the visible surfaces of a three-dimensional substrate, i.e. for example not in the confined cavities of a vehicle body.

After the optional flashing-off phase, the clear lacquer coating composition is exposed to high-energy radiation. Such radiation comprises electron beam radiation or preferably ultraviolet radiation. In the case of electron beam radiation, irradiation must be performed under an inert atmosphere; this is not necessary when using UV radiation. UV radiation sources emitting in the range of wavelengths from 180 to 420 nm, preferably of 200 to 400 nm, are preferred. Examples of such UV radiation sources are optionally doped high, medium and low pressure mercury light sources, gas discharge tubes, such as for example low pressure xenon lamps, pulsed and unpulsed UV lasers, point sources of UV light, such as for example UV-emitting diodes, black light tubes, high energy electron flash devices, such as for example UV flash lamps.

The UV radiation sources may be of a continuously or discontinuously operating design. In the latter case, laser light sources are suitable. Another possibility for providing UW sources which may be rapidly turned on and off (pulsable sources) is to arrange mobile diaphragms in front of the light source or UV flash lamps are used.

Light control systems conventionally used in industrial optics, such as for example absorption filters, reflectors, lens systems, optical fibres, may be used as ancillary devices.

The arrangement of the radiation sources is known in principle; it may be adapted to the particular characteristics of the substrate, for example an automotive body or the components thereof.

For example, the entirety of the substrate may be irradiated, for example while passing through a UV irradiation tunnel or a radiation curtain may be used which moves relative to the substrate. A point source of radiation or a small area light source may also be guided over the substrate by means of an automatic apparatus.

The distance from the radiation source may be fixed or may be adapted to a certain value relative to the shape of the substrate. The radiation sources are preferably at a distance in the range from 2 to 50 cm, particularly preferably from 5 to 30 cm, away from the wet lacquer surface. Where a UV laser is used, a larger distance is possible.

The listed processing measures may, of course, also be combined. This may proceed in a single process stage or in temporally or spatially separate process stages.

The duration of irradiation is, for example, in the range from the duration of a UV flash of for example 100 milliseconds to 5 minutes, depending upon the radiation process used and the nature and number of the UV radiation sources. A duration of irradiation, i.e. the period for which the clear lacquer coating layer is actually exposed to UV radiation, is preferably less than 5 minutes.

When coating three-dimensional substrates of a complicated geometry, such as for example automotive bodies, with radiation-curing lacquers, the problem frequently arises of inadequate curing due to insufficient accessibility for the high-energy radiation, for example in shaded areas, such as for example cavities, folds and other structurally determined undercuts. This problem may be avoided in the process according to the invention, as the degree of curing of the clear lacquer achievable with the process according to the invention is entirely sufficient for the shaded areas, i.e. the degree of curing of the clear lacquer achievable by the thermal curing stage is sufficiently high in those areas which are not visible to the observer. Moreover, it is preferred in the process according to the invention to provide a coating with the clear lacquer coating composition substantially only on external areas, in particular on visible surfaces of a three-dimensional substrate, i.e. for example not in the confined cavities of a vehicle body. In this case, the issue of possibly inadequate curing of the clear lacquer layer in shaded areas is virtually irrelevant. If desired, shaded areas may, however, be irradiated, for example by using point, small area or omnidirectional radiation sources, optionally with an automatic moving apparatus, for example for irradiating internal cavities or edges. Once irradiated, the clear-lacquer coating layer is tack-free and the substrate is sent to the stoving process, during which the clear lacquer coating layer, together with the coloured and/or effect base lacquer layer, is stoved at elevated temperatures of for example 80 to 160° C. or cured at lower temperatures of for example 20 to 60° C. The process according to the invention provides the advantage of making it possible, if desired, to shorten the conventional stoving period, in particular in comparison with stoving period required for a corresponding clear lacquer coating layer produced from a clear lacquer coating composition not containing system B). Final hardness is also achieved more rapidly in the process according to the invention, for example immediately after the stoving process.

The process according to the invention performed using the known wet-on-wet principle allows the production of base lacquer/clear lacquer two-layer lacquer coatings, in particular on motor vehicles and the components thereof, having outstanding optical/aesthetic qualities. The process according to the invention may be used not only for automotive original lacquer coating and component lacquer coating but also for automotive repair lacquer coating. Running of the clear lacquer down vertical surfaces during stoving is effectively prevented. The clear lacquer layers obtained using the process according to the invention exhibit reduced susceptibility to chemicals and scratching, in particular to acid and washing scratches. Surprisingly, the above-stated advantages may be achieved with the process according to the invention, although the resin solids content of the clear lacquer coating composition used in the process according to the invention is of a simple composition and the crosslinking systems A) and B) forming the resin solids content do not crosslink together. The clear lacquer coating compositions may be formulated from known, for example commercially available components. Production of multi-layer lacquer coatings

DETAILED DESCRIPTION OF THE PREFERRED EMBODIMENTS

EXAMPLE 1 (COMPARISON)

A silver-coloured aqueous base lacquer is applied by spraying to a dry film thickness of 15 $\mu$m onto a metal sheet provided with a cataphoretic primer and surfacer layer and is predried for 10 minutes at 80° C. A commercially available automotive original clear lacquer (52 wt. % resin solids content, formed from, hydroxy-functional acrylate binder and melamine resin crosslinking agent) is then applied by spraying to a dry film thickness of 40 $\mu$m, is flashed off for 10 minutes at room temperature then for 1 minute promoted by infrared radiation and is then stoved for 15 minutes at 140° C. (object temperature).

EXAMPLE 2

1000 g of the clear lacquer from Example 1 are homogeneously mixed with 52 g of a mixture prepared from 72 parts by weight of a hexafunctional, aliphatic urethane acrylate (theoretical molecular weight 800), 22 parts by weight of hexanediol diacrylate, 1.5 parts by weight of an acyl phosphine oxide type photoinitiator and 1.5 parts of an acetophenone type photoinitiator.

The resultant clear lacquer is then processed as in Example 1, except that, between flashing-off and stoving, the clear lacquer surface is exposed to the light from a UV flash 10 times within 40 seconds (xenon-filled UV flash lamp, 3500 Ws, object distance 20 cm).

EXAMPLE 3

1000 g of the clear lacquer from Example 1 are homogeneously mixed with 104 g of the mixture stated in Example 2.

The resultant clear lacquer is then processed as in Example 2.

EXAMPLE 4

1000 g of the clear lacquer from Example 1 are homogeneously mixed with 234 g of a mixture prepared from 75 parts by weight of a hexafunctional, aliphatic urethane acrylate (theoretical molecular weight 800), 22 parts by weight of tripropylene glycol diacrylate, 1.5 parts by weight of an acyl phosphine oxide type photoinitiator and 1.5 parts of an acetophenone type photoinitiator.

The resultant clear lacquer is then processed as in Example 2.

EXAMPLE 5

1000 g of the clear lacquer from Example 1 are homogeneously mixed with 26 g of a mixture prepared from 75 parts by weight of a hexafunctional, aliphatic urethane acrylate (theoretical molecular weight 1000), 22 parts by weight of trimethylolpropane triacrylate, 1.5 parts by weight of an acyl phosphine oxide type photoinitiator and 1.5 parts of an acetophenone type photoinitiator.

The resultant clear lacquer is then processed as in Example 2.

EXAMPLE 6

1000 g of the clear lacquer from Example 1 are homogeneously mixed with 88 g of the mixture stated in Example 5.

The resultant clear lacquer is then processed as in Example 2.

EXAMPLE 7

1000 g of the clear lacquer from Example 1 are homogeneously mixed with 78 g of a mixture prepared from 75 parts by weight of a hexafunctional, aliphatic urethane acrylate (theoretical molecular weight 800), 22 parts by weight of trimethylolpropane triacrylate, 1.5 parts by weight of an acyl phosphine oxide type photoinitiator and 1.5 parts of an acetophenone type photoinitiator.

The resultant clear lacquer is then processed as in Example 1, except that, between flashing-off and stoving, the clear lacquer surface is subjected to UV irradiation (medium pressure mercury light source, 120 W/cm, belt speed 3 m/min, object distance 10 cm).

Table 1 shows the properties of the multilayer lacquer coatings obtained in Comparative Example 1 and in Examples 2 to 7 according to the invention.

TABLE 1

| Example | Pendulum hardness | Pendulum hardness after xylene test[1] | Scratch resistance[2] a | Scratch resistance[2] b | Acid resistance[3] |
|---|---|---|---|---|---|
| | (oscillations) | | | | |
| 1 | 91 | 27 | 90 | 55 | 11 |
| 2 | 97 | 42 | 93 | 62 | 20 |
| 3 | 103 | 105 | 89 | 75 | 22 |
| 4 | 115 | 117 | 90 | 71 | ./. |
| 5 | 95 | 90 | 93 | 60 | 22 |
| 6 | 108 | 98 | 93 | 63 | 24 |
| 7 | 120 | 120 | 92 | 79 | >30 |

[1] The xylene test is performed by applying a cotton wool swab saturated with xylene onto the multilayer coating for 10 minutes. Pendulum hardness is measured in each case after a recovery time of 1 hour.

[2] The values stated are initial gloss before exposure to scratching (column a) and residual gloss after the exposure to scratching described below (column b), in each case determined by gloss measurement at an angle of 20°. Exposure to scratching is performed using the reciprocating stroke method with model no. 265 Erichsen-Peters block. Dimensions are: 75×75×50 mm, area of base =3750 mm². Weight is 2 kg. A piece of 2.5 mm thick woolen felt of dimensions 30×50 mm is stuck under the sanding block with adhesive tape. 1 g of a water-soluble abrasive paste is then uniformly distributed over the application surface. 10 to-and-fro strokes are performed in 9 seconds. The reciprocating stroke is made parallel to the 75 mm edge of the block, with the distance covered being 90 mm in one direction. The surface is then rinsed with cold water and the gloss measurement performed.

[3] Acid resistance is tested using the 10% sulfuric acid droplet test. The test sheets are placed on a hotplate and heated to 60° C. Care must be taken to ensure that the sheets lie flat on the hotplate during heating. At the end of the heating phase, i.e. at 60° C, one droplet of the acid is applied onto the clear lacquer surface each minute. The total time is 30 minutes. On completion of the test period, the lacquer coating is washed with water. The value stated is the period of exposure in minutes at which the first visible film change (swelling) occurred.

What is claimed is:

1. A process for coating a substrate with a base lacquer layer and a clear topcoat lacquer layer, comprising:

applying a base lacquer layer onto a substrate, applying an uncured clear topcoat lacquer layer onto the base lacquer layer in a wet-on-wet manner, exposing the uncured clear topcoat lacquer layer to high-energy radiation to partially cure the clear topcoat lacquer layer, and thereafter jointly stoving the base lacquer layer and the clear topcoat lacquer layer, wherein the base lacquer layer comprises at least one feature selected from the group consisting of a color and an effect, wherein the clear topcoat lacquer layer has a resin solids content including 50 wt. % to 98 wt. % of a thermally curable polymer system (A) which is thermally curable by addition reactions, condensation reactions, or both, the system (A) containing substantially no free-radically polymerizable double bonds and substantially no groups capable of reacting in another way with free-radically polymerizable double bonds of system (B), and 2 wt. % to 50 wt. % of a free-radical curing polymer system (B) which is curable via high-energy radiation mediated free-radical polymerization of olefinic double bonds, wherein total weight percentages add up to 100 wt. %, and wherein C═C equivalent weight of the resin solids total content from system (A) and system (B) is between 300 and 10,000.

2. The process of claim 1 wherein the clear topcoat lacquer layer has a resin solids content including 70 wt. % to 95 wt. % of the thermally curable polymer system (A) and 5 wt. % to 30 wt. % of the free-radical curing polymer system (B).

3. The process of claim 1 wherein the C═C equivalent weight of the entire resin solids content formed from the thermally curable polymer system (A) and the free-radical curing polymer system (B) is between 400 and 1500.

4. The process of claim 1 wherein the substrate is a motor vehicle body.

5. A clear lacquer coating composition for coating a substrate, comprising a resin solids content including:

50 wt. % to 98 wt. % of a thermally curable polymer system (A) which is thermally curable by addition reactions, condensation reactions, or both, the system (A) containing substantially no free-radically polymerizable double bonds and substantially no groups capable of reacting in another way with free-radically polymerizable double bonds of system (B), and 2 wt. % to 50 wt. % of a free-radical curing polymer system (B) which is curable via high-energy radiation mediated free-radical polymerization of olefinic double bonds, wherein total weight percentages add up to 100 wt. %, and wherein C=C equivalent weight of the resin solids total content from system (A) and system (B) is between 300 and 10,000.

6. The clear lacquer coating composition of claim 5 wherein the composition has a resin solids content including 70 wt. % to 95 wt. % of the thermally curable polymer system (A) and 5 wt. % to 30 wt. % of the free-radical curing polymer system (B).

7. The clear lacquer coating composition of claim 5 wherein the C=C equivalent weight of the entire resin solids content formed from the thermally curable polymer system (A) and the free-radical curing polymer system (B) is between 400 and 1500.

8. The clear lacquer coating composition of claim 5 wherein the substrate is a motor vehicle body.

* * * * *